(12) United States Patent
Cambron et al.

(10) Patent No.: US 11,673,334 B2
(45) Date of Patent: Jun. 13, 2023

(54) TEMPERATURE CONTROLLED DISPENSING TOOLS FOR THREE-DIMENSIONAL PRINTERS

(71) Applicant: Advanced Solutions Life Sciences, LLC, Louisville, KY (US)

(72) Inventors: Scott Douglas Cambron, Louisville, KY (US); Dakota Waldecker, Louisville, KY (US)

(73) Assignee: Advanced Solutions Life Sciences, LLC, Louisville, KY (US)

( * ) Notice: Subject to any disclaimer, the term of this patent is extended or adjusted under 35 U.S.C. 154(b) by 237 days.

(21) Appl. No.: 16/906,391

(22) Filed: Jun. 19, 2020

(65) Prior Publication Data
US 2020/0398494 A1    Dec. 24, 2020

Related U.S. Application Data

(60) Provisional application No. 62/863,464, filed on Jun. 19, 2019.

(51) Int. Cl.
*B29C 64/393* (2017.01)
*B29C 64/295* (2017.01)
*B29C 64/227* (2017.01)
*B29C 64/205* (2017.01)
(Continued)

(52) U.S. Cl.
CPC .......... *B29C 64/393* (2017.08); *B29C 64/205* (2017.08); *B29C 64/227* (2017.08); *B29C 64/295* (2017.08); *B33Y 30/00* (2014.12); *B33Y 50/02* (2014.12)

(58) Field of Classification Search
CPC ... B29C 64/393; B29C 64/205; B29C 64/227; B29C 64/295
See application file for complete search history.

(56) References Cited

U.S. PATENT DOCUMENTS

2006/0156978 A1\*  7/2006  Lipson .................. B33Y 30/00
                                                  438/3
2014/0242208 A1    8/2014  Elsworthy
(Continued)

OTHER PUBLICATIONS

International Search Report and Written Opinion for Corresponding PCT/US2020/038694 dated Sep. 30, 2020.

*Primary Examiner* — Joseph S Del Sole
*Assistant Examiner* — Mohamed K Ahmed Ali
(74) *Attorney, Agent, or Firm* — Dinsmore & Shohl LLP (57) ABSTRACT

A temperature controlled dispensing tool includes a mount and a temperature controlled module coupled to the mount. The temperature controlled module may include a barrel housing, a barrel insert, one or more heating element, one or more cooling element, one or more temperature sensors, and a control unit. The barrel insert is removably insertable into the barrel housing and configured to receive a material barrel. The one or more heating elements and the one or more cooling elements are in thermal communication with the barrel insert. The control unit is configured to determine a temperature of the temperature controlled module based on the signal of the one or more temperature sensors, and selectively operate the one or more heating elements and the one or more cooling elements thereby controlling a temperature of the temperature controlled module.

21 Claims, 8 Drawing Sheets

(51) Int. Cl.
*B33Y 50/02* (2015.01)
*B33Y 30/00* (2015.01)

(56) References Cited

U.S. PATENT DOCUMENTS

| | | | |
|---|---|---|---|
| 2015/0308931 A1* | 10/2015 | Toogood | B01L 7/00 |
| | | | 435/7.1 |
| 2016/0193785 A1 | 7/2016 | Bell et al. | |
| 2016/0236408 A1* | 8/2016 | Wolf | B29C 48/802 |
| 2017/0335271 A1* | 11/2017 | Maggiore | B29C 48/02 |
| 2018/0099453 A1 | 4/2018 | Cambron | |
| 2018/0144070 A1 | 5/2018 | Golway et al. | |
| 2018/0281280 A1* | 10/2018 | Solorzano | C12N 5/0062 |

* cited by examiner

TEMPERATURE CONTROLLED DISPENSING TOOLS FOR THREE-DIMENSIONAL PRINTERS

CROSS-REFERENCE TO RELATED APPLICATIONS

This application claims the benefit of U.S. Provisional Application Ser. No. 62/863,464, filed Jun. 19, 2019, and entitled "Dispensing Platform for Materials Requiring Temperature Control," the entirety of which is incorporated by reference herein.

TECHNICAL FIELD

The present specification generally relates to three-dimensional printers and, more specifically, temperature controlled material dispensers for three-dimensional printers.

BACKGROUND

Three-dimensional printers may extrude materials in layers to manufacture a part. For desired extrusion properties, extrusion temperatures may be at, above, or below ambient temperature. For example, it may be desirable to heat or cool a material to achieve desired viscosity, material uniformity, material payload viability, etc. Accordingly, it may be desirable to have dispensing tools for three-dimensional printers that provide adjustable, temperature controlled extrusion. Moreover, because material may be provided within material barrels of different sizes, it may be desirable to having modular dispensing tools that may accommodate various sized material barrels.

SUMMARY

In one embodiment, a temperature controlled dispensing tool includes a mount configured to be attached to a robotic arm, and a temperature controlled module coupled to the mount. The temperature controlled module may include a barrel housing, a barrel insert, one or more heating element, one or more cooling element, one or more temperature sensors, and a control unit. The barrel insert is removably insertable into the barrel housing and configured to receive a material barrel. The one or more heating elements and the one or more cooling elements are in thermal communication with the barrel insert. The one or more temperature sensors are configured to output a temperature signal indicative of the temperature of the temperature controlled module. The control unit is configured to determine a temperature of the temperature controlled module based on the signal of the one or more temperature sensors, and selectively operate the one or more heating elements and the one or more cooling elements thereby controlling a temperature of the temperature controlled module.

In another embodiment, a temperature controlled dispensing tool includes a mount configured to be attached to a robotic arm, and a temperature controlled module moveably coupled to the mount, wherein the temperature controlled module is configurable between a loading position and an unloading position. The temperature controlled module includes a barrel housing, a barrel insert, one or more heating elements, one or more cooling elements, a heatsink, one or more temperature sensors, and a control unit. The barrel insert is removably insertable into the barrel housing and is configured to receive a material barrel. The one or more heating elements and the one or more cooling elements are in thermal communication with the barrel insert. The one or more temperature sensors are configured to output a temperature signal indicative of a temperature of the temperature controlled module. The control unit is configured to determine the temperature of the temperature controlled module based on the temperature signal of the one or more temperature sensors, and selectively operate the one or more heating elements and the one or more cooling elements thereby controlling the temperature of the temperature controlled module.

In yet another embodiment, a three-dimensional printer includes a robotic arm and a temperature controlled dispensing tool coupled to the robotic arm. The temperature controlled dispensing tool includes a mount attached to and moved by the robotic arm, and a temperature controlled module coupled to the mount. The temperature controlled module includes a barrel housing, a barrel insert, one or more heating elements, one or more cooling elements, a heatsink, one or more temperature sensors, and a control unit. The barrel insert is removably insertable into the barrel housing and is configured to receive a material barrel. The one or more heating elements and the one or more cooling elements are in thermal communication with the barrel insert. The one or more temperature sensors are configured to output a temperature signal indicative of a temperature of the temperature controlled module. The control unit is configured to determine the temperature of the temperature controlled module based on the temperature signal of the one or more temperature sensors, and selectively operate the one or more heating elements and the one or more cooling elements thereby controlling the temperature of the temperature controlled module.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments as disclosed herein are directed to temperature controlled dispensing tools and three-dimensional printers that may provide adaptable temperature control for dispensing various materials to form a three-dimensional printed object. As will be described in greater detail, during three-dimensional printing, a material barrel containing the desired dispensing material is positioned within a temperature controlled dispensing tool. The temperature controlled dispensing tool may be configured to maintain material barrel temperatures above and/or below ambient temperatures. As will be described below, the temperature control housing includes a temperature controlled module that includes a barrel housing and a barrel insert configured to be inserted into the barrel housing. For printing purposes, the material barrel is placed within the barrel insert. In embodiments described herein the barrel insert and/or other components of the dispensing tool are interchangeable for increased modularity. For example, the barrel insert may be exchanged between various sized barrel inserts such that material selection and quantity can be readily adjusted based on desired printing parameters. Accordingly, temperature controlled (e.g., heated and/or cooled) extrusion may be provided using a single unit having interchangeable parts to accommodate different material barrel sizes and/or material compositions. These and additional features will be described in greater detail herein.

Figure 1A:
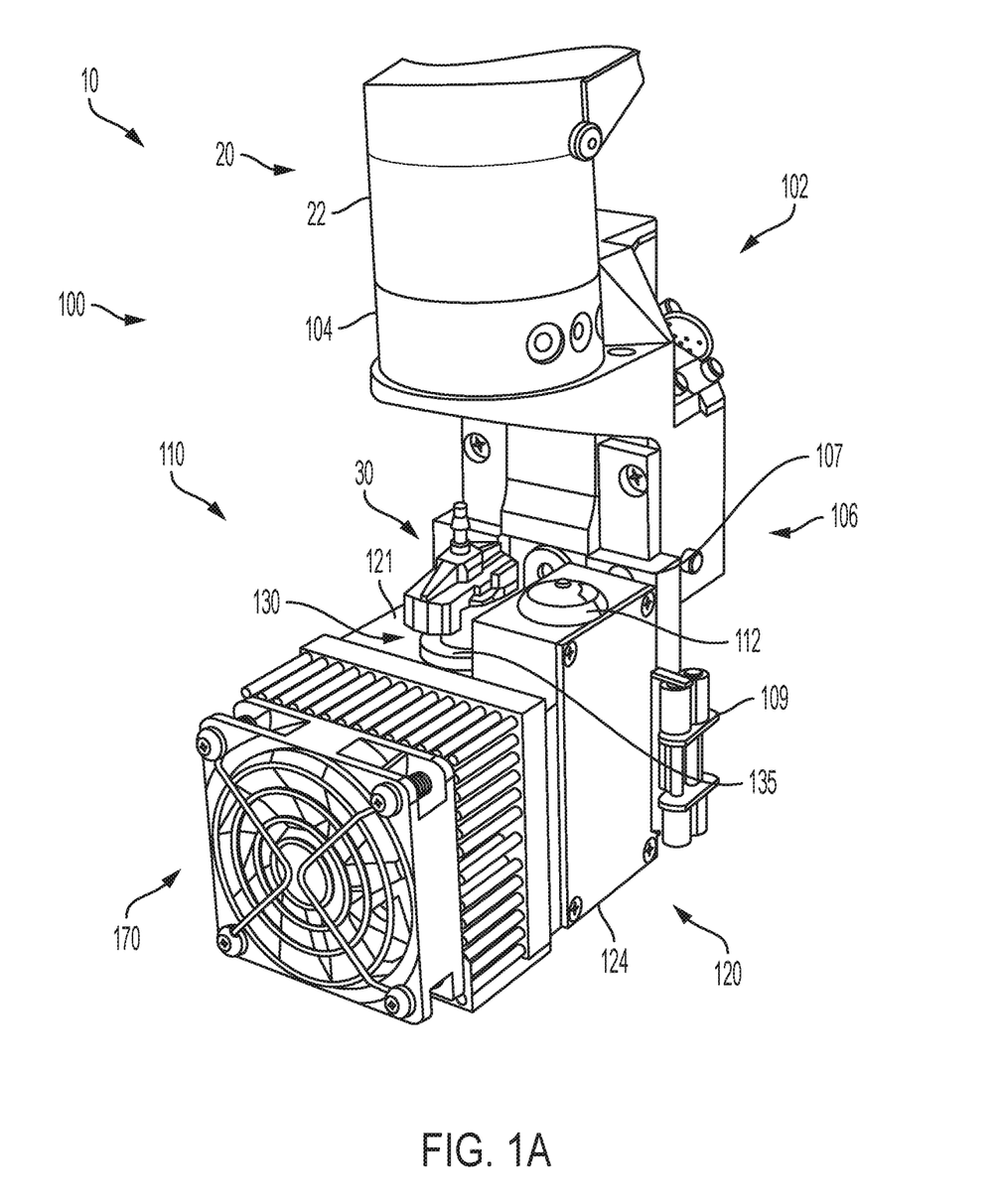
FIG. 1A depicts a perspective view of a cutaway of a three-dimensional printer including a robotic arm and a temperature controlled dispensing tool in a closed position, according to one or more embodiments shown and described herein.
Figure 1B:
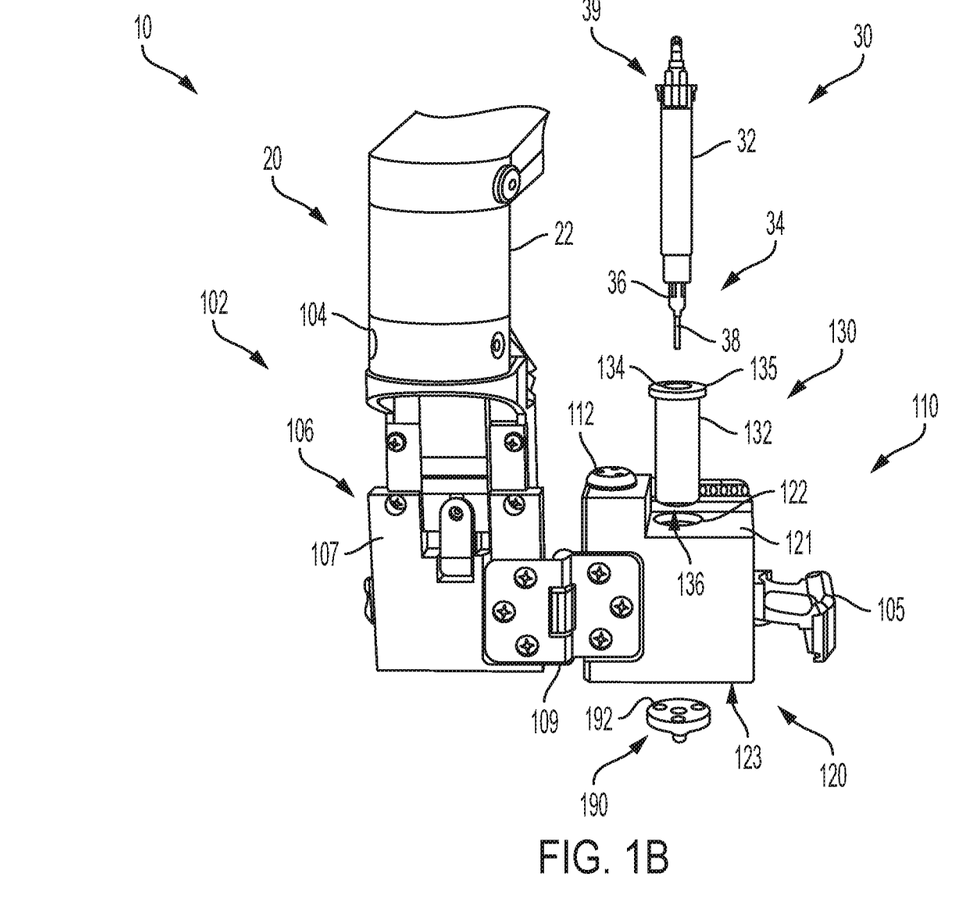
FIG. 1B depicts the dispensing tool of FIG. 1A in an open position, according to one or more embodiments shown and described herein.

FIGS. 1A and 1B generally depict a three-dimensional printer 10 including a robotic arm 20, such as, for example a BioAssemblyBot®, as produced by Advanced Solutions Life Sciences, located in Louisville, Ky. The robotic arm 20 may be configured for various motions along a preprogrammed robot coordinate system. For example, the robotic arm 20 may be configured for 2-Axis motion, 3-Axis motion, 4-Axis motion, 5-Axis motion, 6-Axis motion, 7-Axis motion, or more. A temperature controlled dispensing tool 100 is mounted to a distal end of the robotic arm 20 as an end effector. Accordingly, the robotic arm 20 is configured to be mounted to the temperature controlled dispensing tool 100 and is able to move and/or operate the temperature controlled dispensing tool 100 to perform a print job. It is noted that electrical and/or fluid connections between the dispensing tool 100 and the robotic arm 20 are not shown for simplicity.

As will be described in greater detail herein, the dispensing tool 100 is configured to receive a material barrel 30 containing materials (e.g., metals, polymers, organic polymers, etc.) to be extruded from the dispensing tool 100 to create three-dimensional objects. Material barrels may be provided in a range of sizes. For example, 30 cc or smaller (e.g., 10 cc or smaller), although larger material barrels are contemplated. Material barrel size is typically chosen based on the application and the amount of material which may be needed to produce a part through three-dimensional printing. As illustrated in FIG. 1B a material barrel 30 may include a barrel body 32 for holding the material to be extruded. At a distal end of the barrel body 32 may be a dispensing end 34. The dispensing end 34 may include a reduced diameter portion 36, which has a reduced diameter relative to the barrel body 32 and a dispensing needle 38 mounted to the reduced diameter portion 36. The dispensing needle 38 is configured to dispense material during printing onto a print stage (not shown). Opposite the dispensing end 34 at the proximal end of the material barrel 30 may be an actuation fitting 39. The actuation fitting 39 may be fluidly coupled to a pressure source (not shown). Pressure delivered through the actuation fitting 39 causes material within the material barrel 30 to be extruded through the dispensing needle 38. In some embodiments, instead of pneumatic dispensing, a mechanical actuator (e.g., such as a linear actuator or plunger) may be used for material extrusion from the material barrel 30.

As will be described in greater detail the dispensing tool 100 is adjustable or modular such that different sized material barrels may be used within the dispensing tool without replacement of the dispensing tool 100. Additionally, the dispensing tool 100 is temperature controlled to allow a user to define desired temperature parameters for different materials to be dispensed with the dispensing tool 100.

Figure 2:
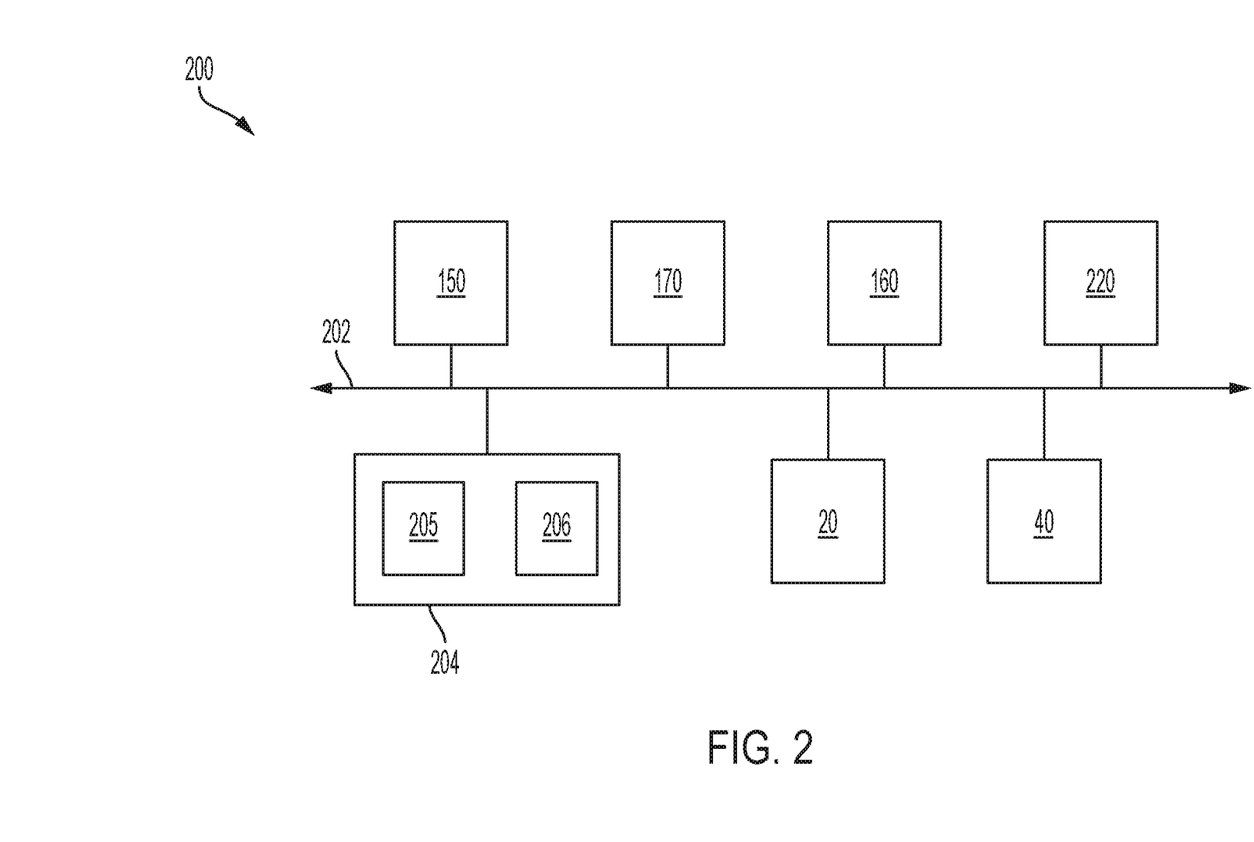
FIG. 2 schematically illustrates a system for controlling a temperature of a temperature controlled dispensing tool such as illustrated in FIGS. 1A and 1B, according to one or more embodiments shown and described herein.

The dispensing tool 100 generally includes a mount 102 and a temperature controlled module 110, which may also be referred to as a chamber, coupled to the mount 102. The temperature controlled module 110 generally includes a barrel housing 120, a barrel insert 130, a heating assembly 150 (depicted in FIG. 3), and a cooling assembly 170. Referring now to FIG. 2, a schematic representation of a system 200 for controlling the dispensing tool 100 and/or the robotic arm 20 are schematically depicted. The system 200 may generally include a communication path 202, a control unit 204, one or more temperature sensors 160, the heating assembly 150, the cooling assembly 170, one or more user interface devices 220, the robotic arm 20, a pressure source 40 or mechanical actuator (not shown). Each of these components will be described in greater detail herein. It is further noted that more or fewer modules and/or components may be included without departing from the scope of the present disclosure.

The communication path 202 may be formed from any medium that is capable of transmitting a signal such as, for example, conductive wires, conductive traces, optical waveguides, or the like, or from a combination of mediums capable of transmitting signals. The communication path 202 communicatively couples the various components of the temperature controlled dispensing tool 100 and/or the three-dimensional printer 10. As used herein, the term "communicatively coupled" means that coupled components are capable of exchanging data signals with one another such as, for example, electrical signals via conductive medium, electromagnetic signals via air, optical signals via optical waveguides, and the like. Accordingly, communication may be facilitated through wired and/or wireless transmissions of data signals.

The control unit 204 generally includes a processor 205 and a memory component 206. The processor 205 can be any device capable of executing machine-readable instructions. Accordingly, the processor 205 may be a controller, an integrated circuit, a microchip, a computer, or any other computing device. The processor 205 is communicatively coupled to the other components of the temperature controlled dispensing tool 100 and/or the three-dimensional printer 10 by the communication path 202. Accordingly, the communication path 202 may communicatively couple any number of processors 204 with one another, and allow the modules coupled to the communication path 202 to operate in a distributed computing environment. Specifically, each of the modules can operate as a node that may send and/or receive data.

The memory component 206, which is coupled to the communication path 202 and communicatively coupled to the processor 205. The memory component 206 may be a non-transitory computer readable medium or non-transitory computer readable memory and may be configured as a nonvolatile computer readable medium. The memory component 206 may include RAM, ROM, flash memories, hard drives, or any device capable of storing machine-readable instructions such that the machine-readable instructions can be accessed and executed by the processor 205. The machine-readable instructions may include logic or algorithm(s) written in any programming language such as, for example, machine language that may be directly executed by the processor 205, or assembly language, object-oriented programming (OOP), scripting languages, microcode, etc., that may be compiled or assembled into machine-readable instructions and stored on the memory component 206. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in computer programming languages, as pre-programmed hardware elements, or as a combination of hardware and software components. As will be described in greater detail below, machine-readable instructions stored on the memory component 206 allows the system 200 to control a temperature within the temperature controlled dispensing tool 100 and/or operation of various printing functions of the three-dimensional printer 10

Referring again to FIGS. 1A and 1B, and as noted above, the temperature controlled dispensing tool 100 includes a mount 102 configured to be mounted to the robotic arm 20. In particular, the mount 102 may include any structure configured for engaging the dispensing tool 100 to the robotic arm 20, such that the robotic arm 20 may manipulate a position of the dispensing tool 100. For example, the mount 102 may include an arm mount portion 104 configured to be mounted to the robotic arm 20 through one or more pins, fasteners, magnets, or like. In some embodiments, the arm mount portion 104 may include a pneumatic connection which may be released via a button, for example. Coupled to the arm mount portion 104 may be a tool mount portion 106 to which the temperature controlled module 110 may be coupled. The tool mount portion 106 may include an engagement surface 107 to which the barrel housing 120 of the temperature controlled module 110 may selectively engage in a closed position such that a printing operation may proceed. For example, and as illustrated in FIG. 1A, in the closed position, an elongate axis of a material barrel 30, when positioned within the barrel housing 120, may be in axial alignment with a portion of the robotic arm (e.g., the wrist 22 portion) and or extend through a wrist portion 22 of the robotic arm 20.

The temperature controlled module 110 may be moveably coupled to the mount 102 so as to be able to move between the closed position, such as illustrated in FIG. 1A and an open position, such as illustrated in FIG. 1B. As illustrated in FIGS. 1A and 1B, in one embodiment, the temperature controlled housing is hingedly coupled, via hinge 109 to the tool mount portion 106. In this embodiment, the temperature controlled module 110 may be rotated about the hinge 109 to an open position as illustrated in FIG. 1B. When in the opened position, the barrel insert 130 and/or the material barrel 30 may be removed and/or replaced with a different barrel insert and/or a different material barrel, as will be explained in greater detail below. Once the desired barrel insert 130 and/or material barrel 30 are inserted into the temperature controlled module 110, the temperature controlled module 110 may be moved back to the closed position as illustrated in FIG. 1A. As illustrated in FIG. 1B, a locking mechanism 105 may be operated to lock the temperature controlled module 110 in the closed position. The locking mechanism 105 may include any number of pins, magnets, latches, fasteners, or the like configured to lock the temperature controlled module 110 in the locked position. For example, FIG. 1B illustrates the locking mechanism 105 as a latch that is configured to latch the temperature controlled module 110 to the tool mount portion 106 to lock the temperature controlled module 110 in the closed position. Accordingly, when it is desired to move the temperature controlled module 110 to the open position, the latch may be unlocked to allow the temperature controlled module 110 to rotate about the hinge 109.

Figure 3A:
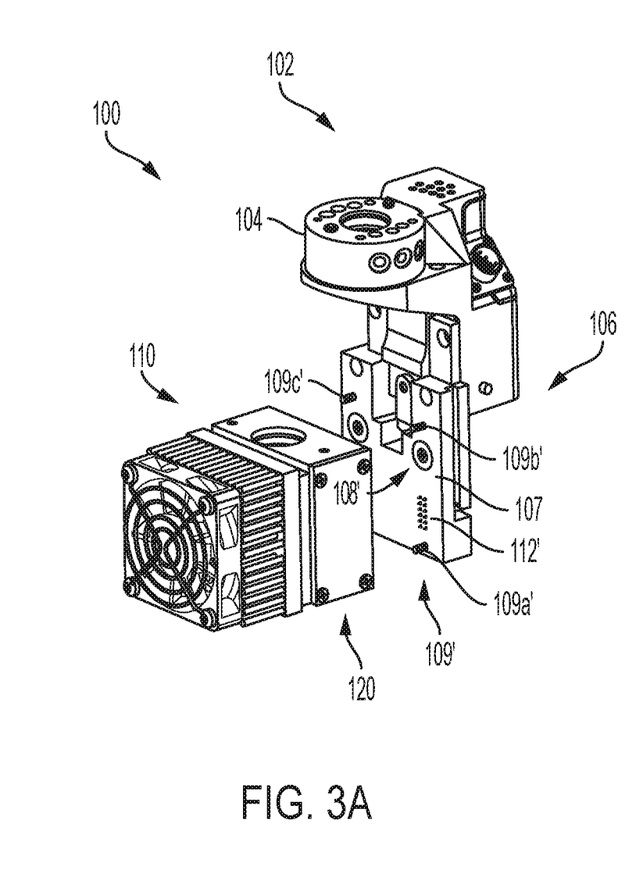
FIG. 3A depicts a perspective view of an embodiment of a temperature controlled dispensing tool, according to one or more embodiments shown and described herein.
Figure 3B:
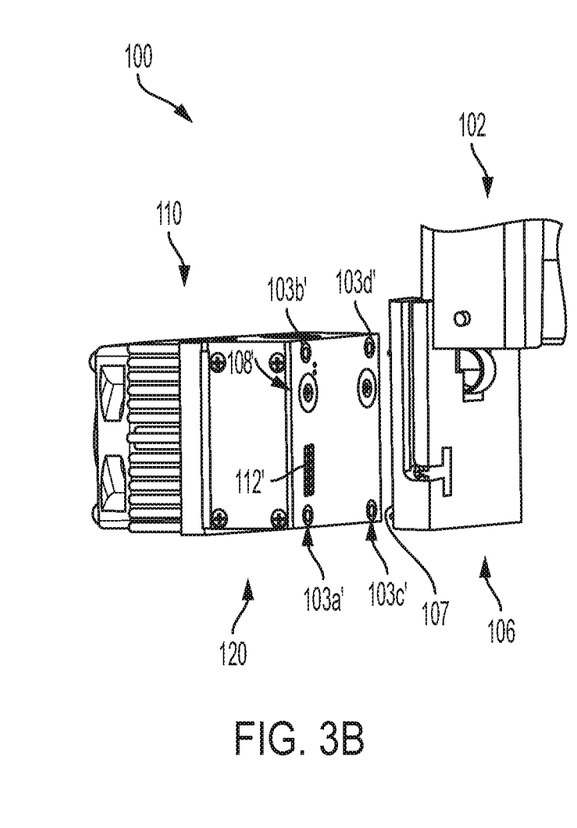
FIG. 3B depicts another perspective view of the temperature controlled dispensing tool of FIG. 3A, according to one or more embodiments shown and described herein.

FIGS. 3A and 3B illustrates a temperature controlled module 110 having an alternative locking mechanism 109'. The alternative locking mechanism 109' includes a plurality of pins (e.g., 109a'-109c'), though less or more pins are contemplated and possible) extending from the engagement surface 107 of the tool mount portion 106. The plurality of pins 109a'-109d' may be configured to be received within a plurality of pin holes (e.g., 103a'-103d') formed within the barrel housing 120 of the temperature controlled module 110. The plurality of pins 109a'-109d may frictionally engage the plurality of pin holes 103a'-103d' to lock the temperature controlled module 110 in the closed position. Accordingly, to release the temperature controlled module 110 to an open position, the temperature controlled module 110 may be pulled from the plurality of pins 109a'-109c'. In some embodiments, one or more magnets 108', such as a plurality of magnets, may be mounted to and/or embedded in at least one of the temperature controlled module 110 and the tool mount portion 106. The one or more magnets 108' are configured to magnetically couples the temperature controlled module 110 to the tool mount portion 106. In such embodiments, the plurality of pins 109a'-109d' and the plurality of pin holes (e.g., 103a'-103d') may provide a locating feature to for precise and repeatable alignment of the temperature controlled module 110 and the tool mount portion 106. In this embodiment, the temperature controlled module 110 may be moved in any direction away from the mount 102. Such embodiments may improve serviceability of the temperature controlled module 110 as the temperature controlled module 110 may be completely disassembled from the mount 102.

In some embodiments, and as illustrated in FIGS. 3A and 3B, electrical communication ports 112' may be formed within the engagement surface 107 of the mount 102 and the temperature controlled module 110 such that when the temperature controlled module 110 is moved to the closed position, electrical signals may be communicated to and from the temperature controlled module 110, for example, to control the temperature within the temperature controlled module 110. In embodiments such as illustrated in FIGS. 1A and 1B, a port 112 may be provided on the barrel housing 120 to route wiring (not illustrated) to the various components and/or modules of the temperature controlled module 110.

Referring again to FIGS. 1A and 1B, the temperature controlled module 110 includes the barrel housing 120. The barrel housing 120 is configured to provide a structure on to which to mount various components of the temperature controlled module 110 including the heating assembly 150 (illustrated in FIG. 4) and/or the cooling assembly 170. In particular, the barrel housing 120 defines a first opening 122 formed through a upper surface 121 of the barrel housing 120 and a second opening 124 formed opposite the first opening 122 in a lower surface 123 of the barrel housing 120, shown in FIG. 4 (illustrating a cross-section of the temperature controlled module 110). As will be described in greater detail herein, the first and second openings 122, 124 allow for insertion of the barrel insert 130 and the material barrel 30 such that a dispensing needle 38 of the material barrel 30 may extend out of the lower surface 123 of the barrel housing 120 to perform three-dimensional printing. Various structures of the barrel housing 120 will be described in relation to various components mounted therein.

As illustrated in FIGS. 1A and 1B, the barrel insert 130 is configured to be removably insertable into the barrel housing 120 and is configured to receive the material barrel 30. FIG. 1A illustrates the barrel insert 130 positioned within the barrel housing 120 with a material barrel 30 positioned therein and FIG. 1B illustrates the barrel insert 130 and the material barrel 30 outside of the barrel housing 120 such as when the barrel insert 130 is being exchanged. The barrel insert 130 may generally include an elongate tube 132 having a receiving opening 134 at a first end of the tube 132, and an exit opening 136 at the second end of the tube 132. At the receiving opening 134 may be an engagement flange 135 such that the elongated tube 132 includes an increased diameter at the first end of the elongate tube 132. The temperature controlled module 110 may be configured to accommodate material barrels having of any size. For example, material barrels having outer diameters of between about 4 mm to about 18 mm and barrel lengths of about 55 mm to about 90 mm though larger or smaller sizes are contemplated and possible. For example, material barrels may provide delivery volumes of about 1 cc to about 10 cc.

Figure 4:
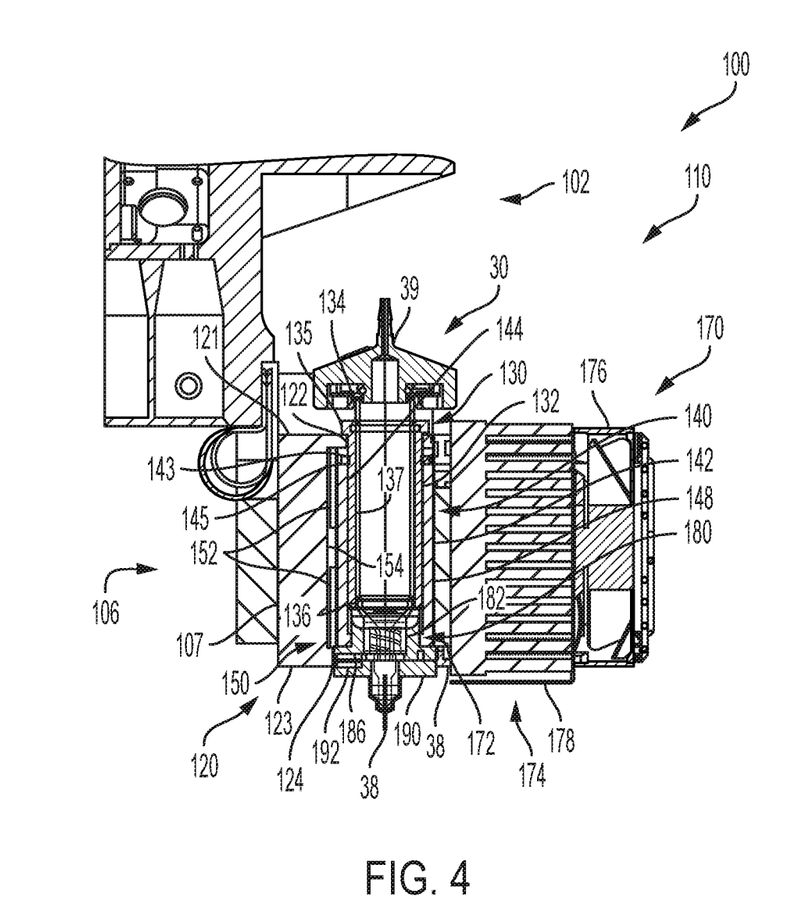
FIG. 4 depicts a cross-section view of the temperature controlled dispensing tool of FIG. 1A, according to one or more embodiments shown and described herein.

FIG. 4 illustrates a cross-sectional view of the assembled temperature controlled module 110. As illustrated the barrel insert 130 may be inserted through the first opening 122 of the barrel housing 120 until the engagement flange 135 contacts the upper surface 121 of the barrel housing 120, thereby limiting the distance the barrel insert 130 may be inserted into the barrel housing 120. In some embodiments, the barrel insert 130 may also contact or bottom out and a thermal cap 180 described in greater detail herein. The internal diameter of the barrel insert 130 may be sized to receive a desired size material barrel. For example, when assembled within the barrel insert 130, the material barrel 30 may be engaged (e.g., circumferentially engaged) with an internal wall 137 of the barrel insert 130 to encourage heat exchange between the barrel insert 130 and the material barrel 30. Accordingly, different sized material barrels may need a different sized barrel insert 130 to ensure adequate heat exchange properties. Depending on the size of the material barrel 30, the barrel insert 130 may be exchanged for an appropriately sized barrel insert 130 (i.e., a barrel insert 130 may a greater or smaller internal diameter for receiving the material barrel 30), thereby providing adjustability and modularity to the temperature controlled module 110.

Still referring to FIG. 4, positioned within the barrel housing 120 and configured to receive the barrel insert 130 may be a thermal capsule 140. The thermal capsule 140 may form part of the heating and or cooling assemblies 150, 170 and may operate to transfer heat to and/or from the barrel housing 120 thereby heating and/or cooling the material barrel 30 (and material within the material barrel 30). The thermal capsule 140 may include a body 142 having a channel 144 formed therein to receive the barrel insert 130. As illustrated, the thermal capsule 140 may be sized and positioned to be in contact (e.g., circumferential contact), or closely situated, relative to the barrel insert 130 to promote heat exchange between the thermal capsule 140 and the barrel insert 130. In some embodiments, the channel 144 of the thermal capsule 140 may include a recessed ring 143 configured to receiving a locking O-ring 145. The locking O-ring 145 may provide friction to maintain placement of the barrel insert 130 within the thermal capsule 140 and/or reduce mechanical vibrations during printing. In some embodiments in addition or in lieu of the locking O-ring 145, one or more locking tabs (not shown) may be selectively positioned over the engagement flange 135 of the barrel insert 130 to lock the barrel insert 130 in place within the barrel housing 120.

Figure 5:
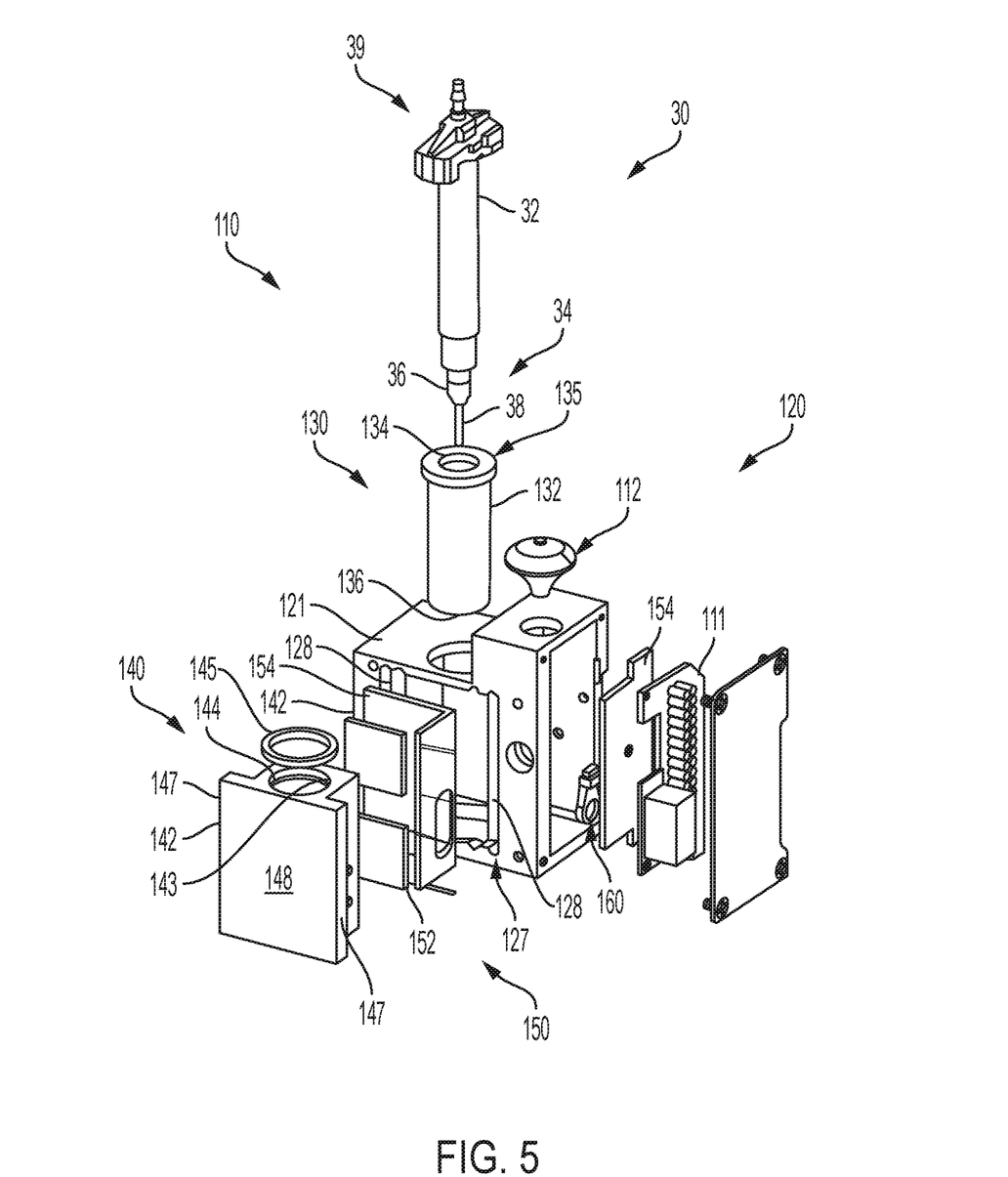
FIG. 5 depicts an exploded view of a portion of the temperature controlled dispensing tool of FIG. 1A, according to one or more embodiments shown and described herein.
Figure 6:
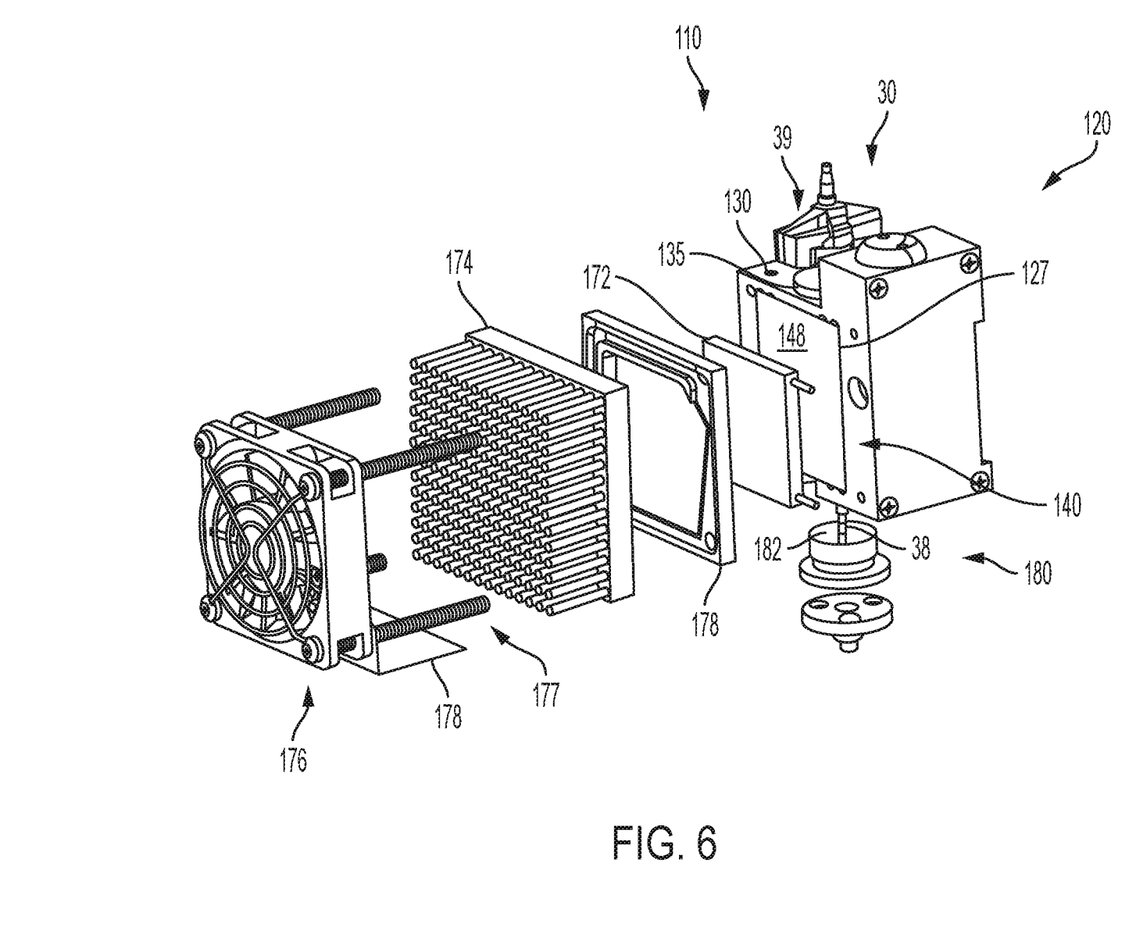
FIG. 6 depicts another exploded view of a portion of the temperature controlled dispensing tool of FIG. 1A, according to one or more embodiments shown and described herein.

FIG. 5 illustrates an exploded view the temperature controlled module 110 without the cooling assembly 170. From this perspective additional detail of the thermal capsule 140 is depicted. The body 142 of the thermal capsule 140 may provide structure on which one or more components of the cooling and heating assemblies 170, 150 may be mounted. The barrel housing 120 may include a capsule engagement opening 127 including recessed engagement walls 128. A majority of the body 142 of the thermal capsule 140 may be configured to be placed within the barrel housing 120 through the capsule engagement opening 127 such that the channel 144 is aligned with the first and second openings 122, 124 of the barrel housing 120. The body 142 of the thermal capsule 140 may further includes one or more extending portions 147 configured to engage the recessed engagement walls 128 of the barrel housing 120, thereby providing alignment between the first and second openings 122, 124 and the channel 144. When mounted to the barrel housing 120 an exterior surface 148 (e.g., extending between the one or more extending portions 147) of the thermal capsule 140 be exposed through capsule engagement opening 127, which may provide a surface on which to mount the cooling assembly 170, as illustrated in FIGS. 4 and 6.

Referring again to FIG. 4, the thermal capsule 140 may include a thermal cap 180 that couples to the body 142 of the thermal capsule 140 so as to partially enclose a dispensing end 34 of the material barrel 30 within the thermal capsule 140. In particular, the thermal cap 180 may include a decreased diameter opening 182 extending therethrough configured to allow a dispensing end 34 of the material barrel 30 to extend. According the thermal cap 180 may enclose a portion of the dispensing end 34 and may provide heat transfer (e.g., through convection where the thermal cap is not in direct contact with the material barrel 30) between the thermal cap 180 and the dispensing end 34 of the material barrel 30 to provide uniform heating of the material barrel 30. The thermal cap 180 may also act as a thermal shield for the dispensing end 34 of the material barrel 30 to ambient temperature to prevent loss of heat to the surround air. The thermal cap 180 may be engaged with the body 142 through any reversible coupling technique (e.g., a threaded engagement, magnets, or the like). For example, and as noted above, different material barrels may be different sizes (e.g., having small or larger diameters). Accordingly, the thermal cap 180 may be interchanged with different sized thermal caps to accommodate different sized material barrels.

Removably coupled to the thermal cap 180 may be a tip cover 190. The tip cover 190 may be provided to partially enclose the dispensing end 34 of the material barrel 30 extending through the thermal cap 180 while allowing for passage of the dispensing needle 38, as illustrated in FIG. 4. The tip cover 190 is configured to shield a majority of a body and cannula of the dispensing needle 38 from the effects of ambient temperature. For example, the tip cover 190 may prevent material being extruded through the dispensing needle 38 from prematurely changing viscosity or uniformity before the material is extruded. An exposed portion of the dispensing needle 38 may be of a length sufficient to allow for dispensing and/or imaging of the dispensing needle while limiting exposure to ambient air which may increase material properties within the dispensing needle during extrusion. Accordingly, only a small portion of the dispensing needle 38 is exposed to the ambient air (e.g., less than 5 mm, less than 4 mm, less than 3 mm etc.). For example, the tip cover 190 may be in thermal communication with the thermal capsule 140 accordingly, the tip cover 190 may be actively heated or cooled with the thermal capsule 140 (e.g., the heating assembly 150 and/or the cooling assembly 170) to maintain the desired temperature within the dispensing needle 38.

The tip cover 190 may be removably coupled to the thermal cap 180 through one or more engagement mechanisms (e.g., magnets, fasteners, etc.). For example, and as illustrated in FIG. 4, the tip cover 190 may include one or more embedded magnets 192 and the thermal cap 180 may include one or more embedded magnets 186. The one or more embedded magnets 192 of the tip cover 190 may be arranged to be attracted to the one or more embedded magnets 186 of the thermal cap 180, such that the tip cover 190 is magnetically attracted to the thermal cap 180. If it is desired the tip cover 190 be removed (e.g., via an automated tip exchange protocol), a user and/or a robotic gripper may overcome the magnetic force by pulling the tip cover 190 from the thermal cap 180. It is noted that use of an automated robotic tool or gripper, not shown, to remove the tip cover may allow for tip exchange without human intervention to maintain a sterile environment. Such robotic tool or gripper may be communicatively coupled to a control unit, such as described below, to allow for automated control. For example, it may be desirable to remove the tip cover 190 to, for example, exchange the dispensing needle 38 and/or replace the tip cover 190 to an appropriately sized tip cover 190 depending on the gauge of the dispensing needle 38. For example, tip covers may be customized to the different needle gauge and/or barrel size to increase modularity of the dispensing tool 100.

The heating assembly 150 may be mounted to the thermal capsule 140 and may include one or more heating elements 152. The one or more heating elements 152 are in thermal communication with the barrel insert 130 through, for example, the thermal capsule 140. Referring to FIG. 2, the heating assembly 150 may be communicatively coupled to the control unit 204 over the communication path 202. The control unit 204 may be configured to selectively operate the one or more heating elements 152 of the heating assembly 150 to control a temperature within the temperature controlled module 110. The one or more heating elements 152 may be any type of heater or heating device configured to produce heat. For example, the one or more heating elements 152 may include one or more resistive heaters, one or more ceramic heaters, or the like. Example heating elements include, but are not limited to, Thorlabs HT24S 20×20 ceramic heaters, Omega CRHP-CRHF ceramic heaters, McMaster 7945T42 adhesive backed silicon pad heaters, etc. Moreover the one or more heating elements 152 may include multiple heating elements 152 (e.g., 2 or more, 4 or more, 6 or more, etc.) In some embodiments, and as illustrated FIG. 4, the one or more heating elements 152 may be mounted to the thermal capsule 140 so as to transfer heat to the thermal capsule 140, the barrel insert 130, and the material barrel 30 to provide a desired temperature to the material within the material barrel 30. In some embodiment, the one or more heating elements 152 may be mounted to any and/or multiple surfaces of the thermal capsule 140. Insulating material 154 (e.g., aerogel insulation) may wrap around an outside of the one or more heating elements 152 and/or thermal capsule 140 to insulate electronic components (e.g., PCB board(s) 111 including one or more portions of the control unit 204) and/or portions of the barrel housing 120 from temperature changes caused by the one or more heating elements 152 and/or the cooling assembly 170.

Referring again to FIG. 2, and as noted above, the system 200 may include one or more temperature sensors 160 communicatively coupled to the control unit 204 over the communication path 202. The one or more temperature sensors 160 may include any sensor configured to output a temperature signal indicative of a temperature of the temperature controlled module 110. Referring to FIG. 5, the one or more temperature sensors 160 may be mounted anywhere on or within the temperature controlled module 110. For example, the one or more temperature sensors 160 may be mounted to and/or within the thermal capsule 140 to detect the temperature of the thermal capsule 140 which may provide indication of the temperature within the temperature controlled module 110 and/or of the material within the material barrel 30. Temperature sensors 160 may include, but are not limited to negative temperature coefficient (NTC) thermistor(s), resistance temperature detector(s) (RTD), Thermocouple(s), and/or semiconductor-based temperature sensor(s). Example temperature sensors include, but are not limited to, Ring Lug NTC Thermistor Surface Temperature Probes, Omega ON-950M-44007 Bolt Mount Thermistor, etc.

Referring now to FIG. 6, the cooling assembly 170 is schematically depicted in an exploded view. The cooling assembly 170 generally includes one or more cooling elements 172, a heat sink 174, and a fan 176. With reference to FIG. 2, the cooling assembly 170 may be communicatively coupled to the control unit 204 over the communication path 202, such that the control unit 204 may execute machine readable instructions to selectively operate the cooling assembly 170 to control a temperature of the temperature controlled module 110.

Referring again to FIG. 6, the one or more cooling elements 172 may be thermally coupled to the thermal capsule 140 thereby placing the one or more cooling elements 172 in thermal communication with the barrel insert 130. The one or more cooling elements 172 may be any type of cooler or cooling device configured to reduce a temperature within the temperature controlled module 110. For example, the one or more cooling elements 172 may include a thermoelectric cooling device also known as a thermoelectric Peltier device. Example cooling elements include, but are not limited to, Custom Thermoelectric's 19911-9Q31-02CQ TEC, TETech's VT-31-1.0-1.3, Laird Thermal Systems 430040-513, etc. The one or more cooling elements 172 may be placed in contact with the exterior surface 148 of the thermal capsule 140 and is configured to draw heat away, thereby cooling, the thermal capsule 140 and objects in contact with the thermal capsule 140 (e.g., the barrel insert 130 and the material barrel 30). The heat sink 174 (e.g., a finned and/or pin-finned heat sink 174 as illustrated) may be mounted to the one or more cooling elements 172 opposite the thermal capsule 140 to draw the heat from the one or more cooling elements 172. Example heat sinks include, but are not limited to Cool innovation's 3-252512RFA, Thermocool's TCP7687, Myheatsink's CF01-60-60-28, etc. The fan 176 may be mounted to the heat sink 174 and direct cooling air into the heat sink 174 to remove heat from the heat sink 174 to efficiently cool the thermal capsule 140. In some embodiments, a moisture barrier be may be mounted around the one or more cooling elements 172 and sandwiched between the heat sink 174 and the barrel housing 120 and the heat sink 174 to prevent condensation formation on the one or cooling elements 172.

In some embodiments, the one or more cooling elements 172 and the one or more heating elements 152 may both include one or more Peltier devices. For example, a Peltier device operates by converting electrical energy into a temperature differential such that a first side of the Peltier device is cooled while a second side of the Peltier devices heats up. Accordingly, in embodiments, reversing polarity of the Peltier device may allow the Peltier device to function as both a heating element and a cooling element.

The fan 176 may be mounted to barrel housing 120 using for example, a plurality of fastening elements 177. In some embodiments, a shield 178 may be mounted along a lower edge of the fan 176 and extend under the fins of the heat sink 174. The shield 178 may prevent air from being directed downward in a dispensing direction toward a print job while printing, which may otherwise disrupt print quality.

Referring again to FIG. 2, in embodiments, the system 200 includes the user interface device 220 communicatively coupled to the control unit 204 over the communication path 202. For example, the user interface device 220 may include any combination or knobs, button, touch screens, microphones, or the like that allow a user to interact with the system 200. A user may interact with the system 200 via the user interface device 220 to input desired temperatures and/or ranges into the system 200 for a particular print job.

In some embodiments, cooling and/or heating may be defaulted within the temperature controlled housing. For example, power may be supplied to the one or more heating elements 152 and/or the one or more cooling elements 172. A relay switch (not shown) may be provided to modulate between operation of the one or more heating elements 152 and the one or more cooling elements 152 to achieve a desired temperature within the temperature controlled module 110. For example, heating with the one or more heating elements 152 may be the default position of the switch. The control unit 204 may be communicatively coupled to the switch (or an actuator capable of actuating the switch) to control a position of the switch. During operation the control unit 204 may monitor the temperature within the temperature controlled module 110 with the one or more temperature sensors 160. Once the temperature reaches beyond (e.g., above or below) a desired temperature, the other of the heating and/or cooling elements 152, 172 may be operated to maintain the desired temperature within the temperature controlled module 110.

It is noted that embodiments as described herein may be configured to provide broad temperature ranges within the temperature controlled module 110. For example temperatures in the range of about −10° C. to about 190° C., though higher and/or lower temperatures are contemplated and possible. Accordingly, precise temperature control may be achieved.

In some embodiments, the robotic arm 20 and/or the pressure source 40 may be communicatively coupled to the control unit 204 over the communication path 202. Accordingly, in some embodiments, the control unit 204 may monitor the temperature within the temperature controlled dispensing tool 100 with the one or more temperature sensors 160 and only operate to print a three-dimensional construct when the temperature of the temperature controlled dispensing tool 100 is at or within a desired range.

Figure 7:
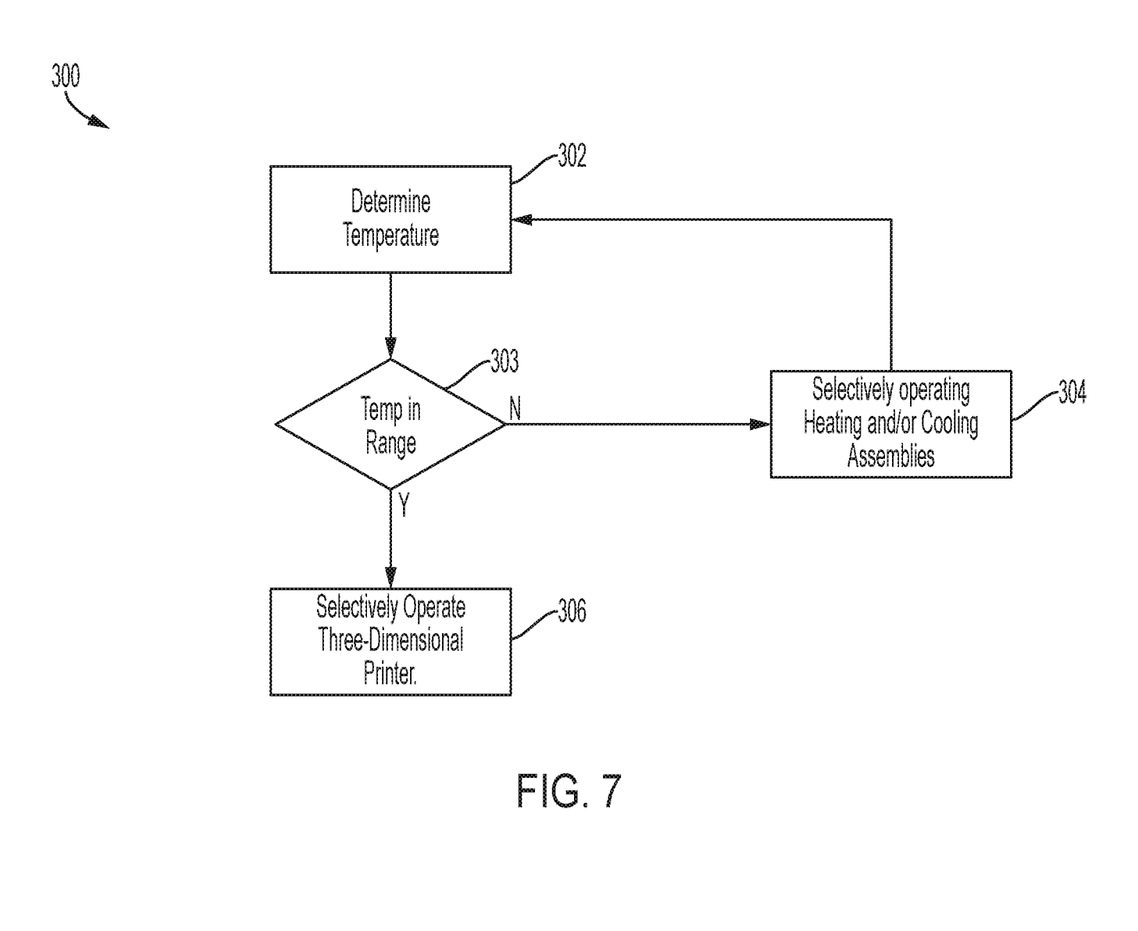
FIG. 7 depicts a flow chart illustrating operation of a three-dimensional printer and/or temperature controlled dispensing tool, according to one or more embodiments shown and described herein.

FIG. 7 schematically depicts a flowchart 300 illustrating operation of a three-dimensional printer 10 and/or the temperature controlled dispensing tool 100, according to one or more embodiments. It is noted that operation of the three-dimensional printer 10 and/or the temperature controlled dispensing tool 100 may include a greater or fewer number of steps without departing from the scope of the present disclosure. In particular, the control unit 204 may determine the temperature of the temperature controlled module 110 based on the temperature signal of the one or more temperature sensors 160 at block 302. That is, the control unit 204 may receive the temperature signal of the one or more temperature sensors 160 and determine, based on the temperature signal the temperature of the temperature controlled module 110 and/or the temperature of the material within the material barrel 30. Once the temperature is determined, the control unit 204 may determine whether or not the temperature is within a predetermined temperature range at block 303. Where the temperature is determined not to be within the predetermined range, the control unit 204 may selectively operate the heating assembly 150 and/or the cooling assembly 170 thereby controlling the temperature of the temperature controlled module 110, at block 304. For example, the control unit 204 may selectively limit/shunt power to the heating assembly 150, the cooling assembly 170, or components thereof (e.g., fan 176). In some embodiments, and at block 306, the control unit 204 may selectively operate the three-dimensional printer 10 to dispense material in response to the temperature of the temperature controlled module 110 and/or the temperature of the material within the material barrel 30 is within the predetermined range (e.g., within a range wherein the material within the three-dimensional barrel may be extruded having the desired material properties such as viscosity, density, or the like). In some embodiments, where the temperature is not within the predetermined temperature range, the control unit 204 may prevent operation of the three-dimensional printer 10 and/or issue a warning with the user interface device 220 indicating that the temperature of the temperature controlled module 110 and/or the material within the material barrel 30 are not within the predetermined range. In some embodiments, for example, the predetermined temperature range may be provided by a user through the user interface device 220. The control unit 204 may perform one or more of the above-steps while saving (e.g., on the one or more memory modules 206), temperature data for traceability of whether the temperature was within or out of the predetermined range.

It should now be understood that embodiments as provided herein are directed to temperature controlled dispensing tools and three-dimensional printers providing precise temperature controlled and modularity. In particular, embodiments of the present disclosure are able to accommodate, through modular interchangeable components, various material barrel sizes. Thus providing improved printing efficiency and quality.

Embodiments can be described with reference to the following numerical clauses:

1. A temperature controlled dispensing tool, comprising: a mount configured to be attached to a robotic arm; a temperature controlled module coupled to the mount, the temperature controlled module comprising: a barrel housing; a barrel insert removably insertable into the barrel housing and configured to receive a material barrel; one or more heating elements in thermal communication with the barrel insert; one or more cooling elements in thermal communication with the barrel insert; one or more temperature sensors configured to output a temperature signal indicative of a temperature of the temperature controlled module; and a control unit configured to: determine the temperature of the temperature controlled module based on the temperature signal of the one or more temperature sensors; and selectively operate the one or more heating elements and the one or more cooling elements thereby controlling the temperature of the temperature controlled chamber.

2. The dispensing tool of clause 1, wherein the barrel insert is interchangeable between various sized barrel inserts.

3. The dispensing tool of any preceding clause, wherein the temperature controlled module further comprises a thermal capsule positioned within the barrel housing and configured to receive the barrel insert.

4. The dispensing tool of any preceding clause, wherein the one or more heating elements comprise one or more ceramic heaters coupled to the thermal capsule.

5. The dispensing tool of any preceding clause, wherein the one or more cooling elements comprise a Peltier device coupled to the thermal capsule.

6. The dispensing tool of any preceding clause, wherein the one or more cooling elements further comprise: a heat sink coupled to the Peltier device opposite the thermal capsule; and a fan directing air onto the heat sink.

7. The dispensing tool of any preceding clause, further comprising a tip cover configured to be removably coupled to the thermal capsule, wherein a dispensing needle of a barrel positioned within the barrel insert extends through the tip cover.

8. A temperature controlled dispensing tool, comprising: a mount configured to be attached to a robotic arm; and a temperature controlled module moveably coupled to the mount, wherein the temperature controlled module is configurable between a loading position and an unloading position, the temperature controlled module comprising: a barrel housing; a barrel insert removably insertable into the barrel housing and configured to receive a material barrel; one or more heating elements in thermal communication with the barrel insert; one or more cooling elements in thermal communication with the barrel insert; one or more temperature sensors configured to output a temperature signal indicative of a temperature of the temperature controlled module; and a control unit configured to: determine the temperature of the temperature controlled module based on the temperature signal of the one or more temperature sensors; and selectively operate the one or more heating elements and the one or more cooling elements thereby controlling the temperature of the temperature controlled chamber.

9. The dispensing tool of any preceding clause, wherein the barrel insert is interchangeable between various sized barrel inserts.

10. The dispensing tool of any preceding clause, wherein the temperature controlled module further comprises a thermal capsule positioned within the barrel housing and configured to receive the barrel insert.

11. The dispensing tool of any preceding clause, wherein the one or more heating elements comprise one or more ceramic heaters coupled to the thermal capsule.

12. The dispensing tool of any preceding clause, wherein the one or more cooling elements comprise a Peltier device coupled to the thermal capsule.

13. The dispensing tool of any preceding clause, wherein the one or more cooling elements further comprise: a heat sink coupled to the Peltier device opposite the thermal capsule; a fan directing air onto the heat sink; and a shield configured to block flow of air from the fan in a dispensing direction.

14. The dispensing tool of any preceding clause, further comprising a tip cover configured to be removably coupled to the thermal capsule, wherein a dispensing needle of a barrel positioned within the barrel insert extends through the tip cover.

15. Three-dimensional printer comprising: a robotic arm; and a temperature controlled dispensing tool coupled to the robotic arm, comprising: a mount attached to and moved by the robotic arm; and a temperature controlled module coupled to the mount, the temperature controlled chamber comprising: a barrel housing; a barrel insert removably insertable into the barrel housing and configured to receive a material barrel; one or more heating elements in thermal communication with the barrel insert; one or more cooling elements in thermal communication with the barrel insert; one or more temperature sensors configured to output a temperature signal indicative of a temperature of the temperature controlled module; and a control unit configured to: determine the temperature of the temperature controlled module based on the temperature signal of the one or more temperature sensors; and selectively operate the one or more heating elements and the one or more cooling elements thereby controlling the temperature of the temperature controlled chamber.

16. The three-dimensional printer of any preceding clause, wherein the barrel insert is interchangeable between various sized barrel inserts.

17. The three-dimensional printer of any preceding clause, wherein the temperature controlled module further comprises a thermal capsule positioned within the barrel housing and configured to receive the barrel insert.

18. The three-dimensional printer of any preceding clause, wherein the one or more heating elements comprise one or more ceramic heaters coupled to the thermal capsule.

19. The three-dimensional printer of any preceding clause, wherein the one or more cooling elements comprise a Peltier device coupled to the thermal capsule.

20. The three-dimensional printer of any preceding clause, wherein the one or more cooling elements further comprise: a heat sink coupled to the Peltier device opposite the thermal capsule; a fan directing air onto the heat sink; and a shield configured to block flow of air from the fan in a dispensing direction.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A temperature controlled dispensing tool, comprising:
   a mount configured to be attached to a robotic arm and having an engagement surface;
   a temperature controlled module rotatably coupled to the mount and movable between a closed position and an opened position, the temperature controlled module comprising:
      a barrel housing configured to selectively engage with the engagement surface, the barrel housing engages with the engagement surface when the temperature controlled module is in the closed position;
      a barrel insert removably insertable into the barrel housing and configured to receive a material barrel when the temperature controlled module is in the opened position;
      one or more heating elements in thermal communication with the barrel insert;
      one or more cooling elements in thermal communication with the barrel insert;
      one or more temperature sensors configured to output a temperature signal indicative of a temperature of the temperature controlled module; and
      a control unit configured to:
         determine the temperature of the temperature controlled module based on the temperature signal of the one or more temperature sensors; and
         selectively operate the one or more heating elements and the one or more cooling elements thereby controlling the temperature of the temperature controlled module,
      wherein the heating elements are disposed on one side of the barrel insert and the cooling elements are disposed opposite to the one side of the barrel insert.

2. The dispensing tool of claim 1, wherein the barrel insert is interchangeable between various sized barrel inserts.

3. The dispensing tool of claim 1, wherein the temperature controlled module further comprises a thermal capsule positioned within the barrel housing and configured to receive the barrel insert.

4. The dispensing tool of claim 3, wherein the one or more heating elements comprise one or more ceramic heaters coupled to the thermal capsule.

5. The dispensing tool of claim 3, wherein the one or more cooling elements comprise a Peltier device coupled to the thermal capsule.

6. The dispensing tool of claim 5, wherein the one or more cooling elements further comprise:
   a heat sink coupled to the Peltier device opposite the thermal capsule;
   and a fan directing air onto the heat sink.

7. The dispensing tool of claim 3, further comprising a tip cover configured to be removably coupled to the thermal capsule, wherein a dispensing needle of a barrel positioned within the barrel insert extends through the tip cover.

8. A temperature controlled dispensing tool, comprising:
   a mount configured to be attached to a robotic arm and having an engagement surface; and
   a temperature controlled module rotatably coupled to the mount and movable between a closed position and an opened position, the temperature controlled module comprising:
      a barrel housing configured to selectively engage with the engagement surface, the barrel housing engages with the engagement surface when the temperature controlled module is in the closed position;
      a barrel insert removably insertable into the barrel housing and configured to receive a material barrel when the temperature controlled module is in the opened position;
      one or more heating elements in thermal communication with the barrel insert;
      one or more cooling elements in thermal communication with the barrel insert;
      one or more temperature sensors configured to output a temperature signal indicative of a temperature of the temperature controlled module; and
      a control unit configured to:
         determine the temperature of the temperature controlled module based on the temperature signal of the one or more temperature sensors; and
         selectively operate the one or more heating elements and the one or more cooling elements thereby controlling the temperature of the temperature controlled module,
      wherein the heating elements are disposed on one side of the barrel insert and the cooling elements are disposed opposite to the one side of the barrel insert.

9. The dispensing tool of claim 8, wherein the barrel insert is interchangeable between various sized barrel inserts.

10. The dispensing tool of claim 8, wherein the temperature controlled module further comprises a thermal capsule positioned within the barrel housing and configured to receive the barrel insert.

11. The dispensing tool of claim 10, wherein the one or more heating elements comprise one or more ceramic heaters coupled to the thermal capsule.

12. The dispensing tool of claim 10, wherein the one or more cooling elements comprise a Peltier device coupled to the thermal capsule.

13. The dispensing tool of claim 12, wherein the one or more cooling elements further comprise:
   a heat sink coupled to the Peltier device opposite the thermal capsule;
   a fan directing air onto the heat sink; and
   a shield configured to block flow of air from the fan in a dispensing direction.

14. The dispensing tool of claim 10, further comprising a tip cover configured to be removably coupled to the thermal capsule, wherein a dispensing needle of a barrel positioned within the barrel insert extends through the tip cover.

15. Three-dimensional printer comprising:
   a robotic arm; and
   a temperature controlled dispensing tool coupled to the robotic arm, comprising:
      a mount attached to and moved by the robotic arm and having an engagement surface; and a temperature controlled module rotatably coupled to the mount and movable between a closed position and an opened position, the temperature controlled module comprising:
- a barrel housing configured to selectively engage with the engagement surface, the barrel housing engages with the engagement surface when the temperature controlled module is in the closed position;
- a barrel insert removably insertable into the barrel housing and configured to receive a material barrel when the temperature controlled module is in the opened position;
- one or more heating elements in thermal communication with the barrel insert;
- one or more cooling elements in thermal communication with the barrel insert;
- one or more temperature sensors configured to output a temperature signal indicative of a temperature of the temperature controlled module; and
- a control unit configured to:
- determine the temperature of the temperature controlled module based on the temperature signal of the one or more temperature sensors; and
- selectively operate the one or more heating elements and the one or more cooling elements thereby controlling the temperature of the temperature controlled module, wherein the heating elements are disposed on one side of the barrel insert and the cooling elements are disposed opposite to the one side of the barrel insert.

16. The three-dimensional printer of claim 15, wherein the barrel insert is interchangeable between various sized barrel inserts.

17. The three-dimensional printer of claim 15, wherein the temperature controlled module further comprises a thermal capsule positioned within the barrel housing and configured to receive the barrel insert.

18. The three-dimensional printer of claim 17, wherein the one or more heating elements comprise one or more ceramic heaters coupled to the thermal capsule.

19. The three-dimensional printer of claim 17, wherein the one or more cooling elements comprise a Peltier device coupled to the thermal capsule.

20. The three-dimensional printer of claim 19, wherein the one or more cooling elements further comprise:
- a heat sink coupled to the Peltier device opposite the thermal capsule;
- a fan directing air onto the heat sink; and
- a shield configured to block flow of air from the fan in a dispensing direction.

21. The dispensing tool of claim 1, wherein the engagement surface includes an electrical communication port configured to communicate an electrical signal to the temperature controlled module when the temperature.

* * * * *